United States Patent
Fang et al.

(10) Patent No.: US 7,062,345 B2
(45) Date of Patent: Jun. 13, 2006

(54) WAFER LOT IDENTITY MANAGEMENT SYSTEM AND METHOD THEREOF

(75) Inventors: Gwo-Chiang Fang, Pingjhen (TW); Hung-Yi Lin, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 23 days.

(21) Appl. No.: 10/818,257

(22) Filed: Apr. 5, 2004

(65) Prior Publication Data

US 2005/0228526 A1    Oct. 13, 2005

(51) Int. Cl.
*G06F 19/00* (2006.01)
(52) U.S. Cl. .............. 700/115; 700/215; 700/225; 700/236; 705/22; 705/28; 705/404
(58) Field of Classification Search ........ 700/107, 700/215, 225, 236, 115; 705/22, 28, 29, 705/404; 707/7, 104.1
See application file for complete search history.

(56) References Cited

U.S. PATENT DOCUMENTS

| | | | |
|---|---|---|---|
| 4,459,663 A | * | 7/1984 | Dye ........................ 705/29 |
| 6,023,683 A | * | 2/2000 | Johnson et al. ............ 705/26 |
| 6,105,004 A | * | 8/2000 | Halperin et al. ........... 705/28 |
| 6,549,891 B1 | * | 4/2003 | Rauber et al. ............. 705/28 |
| 6,650,958 B1 | * | 11/2003 | Balazs et al. ............. 700/121 |
| 6,704,612 B1 | * | 3/2004 | Hahn-Carlson ............ 700/213 |
| 6,754,666 B1 | * | 6/2004 | Brookler et al. .......... 707/102 |
| 6,886,748 B1 | * | 5/2005 | Moore .................... 235/435 |
| 2005/0096782 A1 | * | 5/2005 | Chen et al. .............. 700/224 |

* cited by examiner

*Primary Examiner*—Jayprakash N. Gandhi
*Assistant Examiner*—Sheela S. Rao
(74) *Attorney, Agent, or Firm*—Thomas, Kayden, Horstemeyer & Risley

(57) ABSTRACT

A system and method for wafer lot identity (ID) management including a storage device and an information process module. The storage device is capable of storing a plurality of ID mapping records, each ID mapping record storing a client lot ID and a supplier lot ID relationship. The information process module is configured to receive an information request with the client lot ID from a client, acquire the supplier lot ID from the ID mapping record according to the received client lot ID, acquire manufacturing information or logistical information according to the acquired supplier lot ID, and send the manufacturing information or the logistical information to the client.

28 Claims, 6 Drawing Sheets

| Client Name | Client Lot ID | Supplier Lot ID |
|---|---|---|
| AAA | F12345.1 | F12345.1 |
| BBB | XT12345-01 | C12345.00 |
| CCC | C3010011 | N12345.00 |
| CCC | C3010011 | N12345.01 |
| CCC | C3010011 | N12345.02 |

FIG. 3

WAFER LOT IDENTITY MANAGEMENT SYSTEM AND METHOD THEREOF

BACKGROUND

The present invention relates to wafer lot identity management technology, and more particularly, to a method and system of wafer lot identity conversion.

During semiconductor manufacturing, the semiconductor wafer passes through a series of process steps, which are performed by various fabrication tools, such as photolithography, chemical-mechanical polishing, or chemical vapor deposition. For example, in the production of an integrated semiconductor with 15 micron product, the semiconductor wafer may pass through up to 600 process steps.

Integrated circuits are typically fabricated by processing one or more wafers as a "lot" with a series of wafer fabrication tools (i.e., "processing tools"). Wafer lot identities (ID) are provided to monitor and control the wafer lots among various fabrication tools and automated systems via a manufacturing execution system (MES) or a management information system (MIS) A client may use the wafer lot IDs to query processing status, projected finish date, engineering data or directly execute limited process control, such as holding a wafer lot or banking a wafer lot. The wafer lot ID is composed of multiple characters and may be encoded with reference to a manufacturing fab, lot created date or sequence number. Suppliers or clients may respectively employ proprietary encoding rules to identify their wafer lots.

Conventionally, an operator must use a supplier lot ID but not a client lot ID to acquire relevant manufacturing information or execute process control via systems provided by a supplier. The operator must convert the client lot ID to the supplier lot ID according to a mapping sheet. The labor-intensive nature of lot ID conversion using conventional means is detrimental to client satisfaction. Additionally, negligence in lot ID conversion can result in execution of the wrong process control or failure to acquire correct manufacturing information.

In view of these limitations, a need exists for a system and method of wafer lot ID management that increases client satisfaction in information acquisition and process control.

SUMMARY

It is therefore an object of the present invention to provide a system and method of wafer lot ID management for information acquisition and process control that increases client satisfaction.

According to an embodiment of the invention, the system includes an identity (ID) management apparatus, a manufacturing execution system (MES) and a management information system (MIS).

A storage device included in the MES stores manufacturing information, such as processing status, engineering data, a projected finish date or others, of wafer lots. The MES also includes a software interface to provide manufacturing information or execute process controls, such as holding a lot, banking a lot, releasing a held lot, releasing a banked lot, and the like, according to a supplier lot ID.

The MIS manages logistical information for wafer lots including projected delivery date, shipping notice, invoice or others, and provides a software interface to the logistical information according to the supplier lot ID.

The ID management apparatus includes a central processing unit (CPU), a memory, a storage device, an input device, a display device and a communication device. The CPU, controlled by instructions received from the memory and an operator through the input device, executes ID management functions. The storage device stores multiple identity mapping records. The identity mapping record preferably includes a client name, a client lot identity and a supplier lot identity. The memory preferably includes a mapping record generation module and an information process module, which include routines for performing lot ID management functions.

The mapping record generation module creates an identity mapping record containing a client lot ID and a supplier lot ID when a new wafer lot is initiated or lot status is changed. The module additionally separates an identity mapping record into multiple identity mapping records upon receiving a message indicating that a wafer lot has been split into smaller lots during the semiconductor manufacturing process.

The information process module receives an information request with a client lot ID from a client and subsequently acquires at least one supplier lot ID from the identity mapping records. The manufacturing information, such as processing status, engineering data, a projected finish date or others, is acquired by issuing an information request with the supplier lot ID to the MES. The logistic information, such as projected delivery date, shipping notice, invoice or others, is acquired by issuing an information request with the supplier lot ID to the MIS. Finally, the resulting information is sent to the client.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 3 is a diagram of exemplary identity mapping records according to one embodiment of the present invention;

DESCRIPTION

Figure 1:
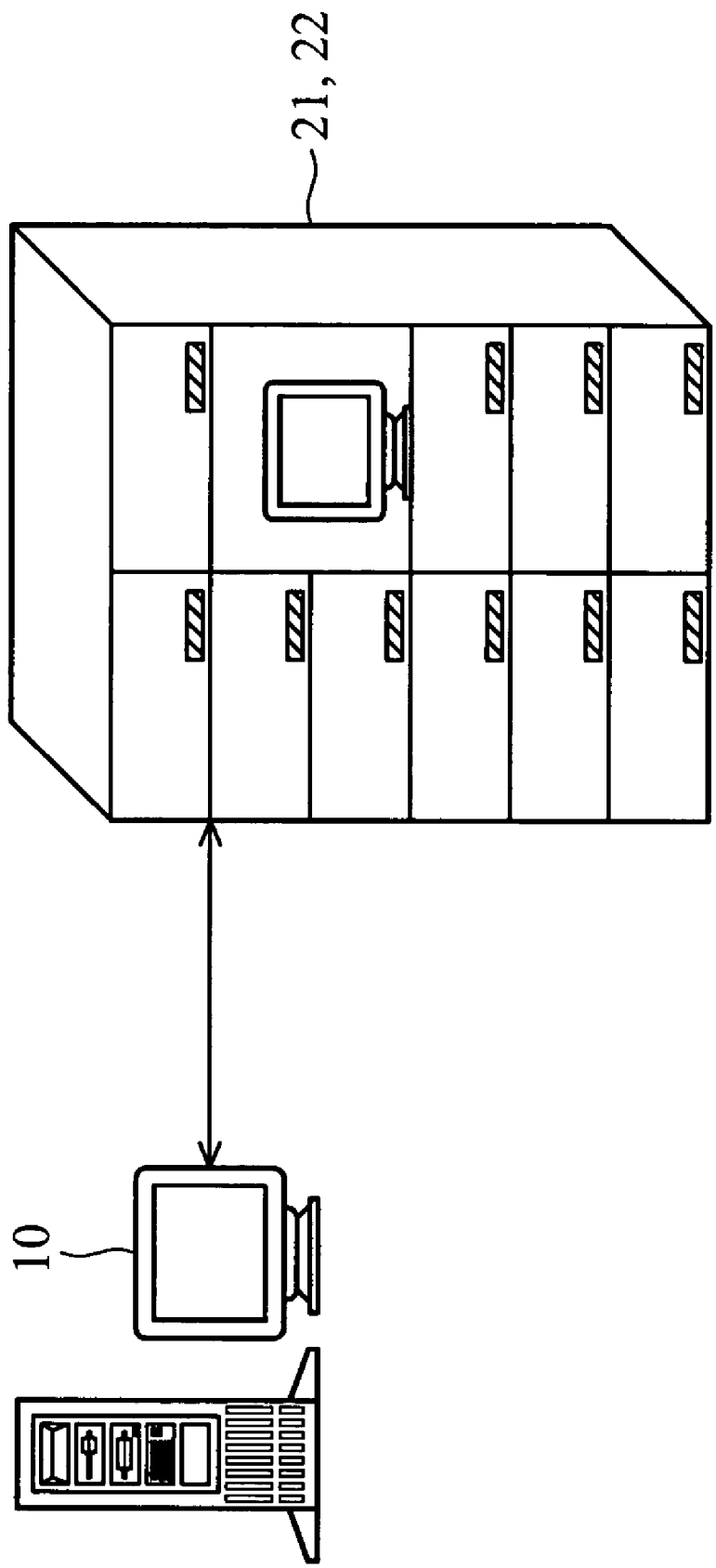
FIG. 1 is a diagram of the architecture of the system for wafer lot identity (ID) management according to one embodiment of the present invention.

FIG. 1 is a diagram of the architecture of the system for wafer lot identity management according to the present invention. According to an embodiment of the invention, the system includes an identity (ID) management apparatus 10, a manufacturing execution system (MES) 21 and a management information system (MIS) 22.

The MES 21 connects to a plurality of host computers (not shown) and each host computer connects to a plurality of fabrication tools (not shown). An Equipment Automation Program (EAP) is embedded in the host computer for transferring messages and issuing commands between the MES 21 and the fabrication tool. The MES 21 follows a series of standard procedural steps to send messages to the EAP, and the EAP controls the fabrication tool accordingly. A storage device included in the MES 21 stores manufacturing information, such as processing status, engineering data, a projected finish date or others, for wafer lots. The MES also includes a software interface to provide manufacturing information or execute process control, such as holding a lot, banking a lot, releasing a held lot, releasing a banked lot, and the like, according to a supplier lot ID.

The MIS 22 manages logistical information, such as projected delivery date, shipping notice, invoice or others, for wafer lots, and includes a software interface to provide logistical information according to the supplier lot ID.

Figure 2:
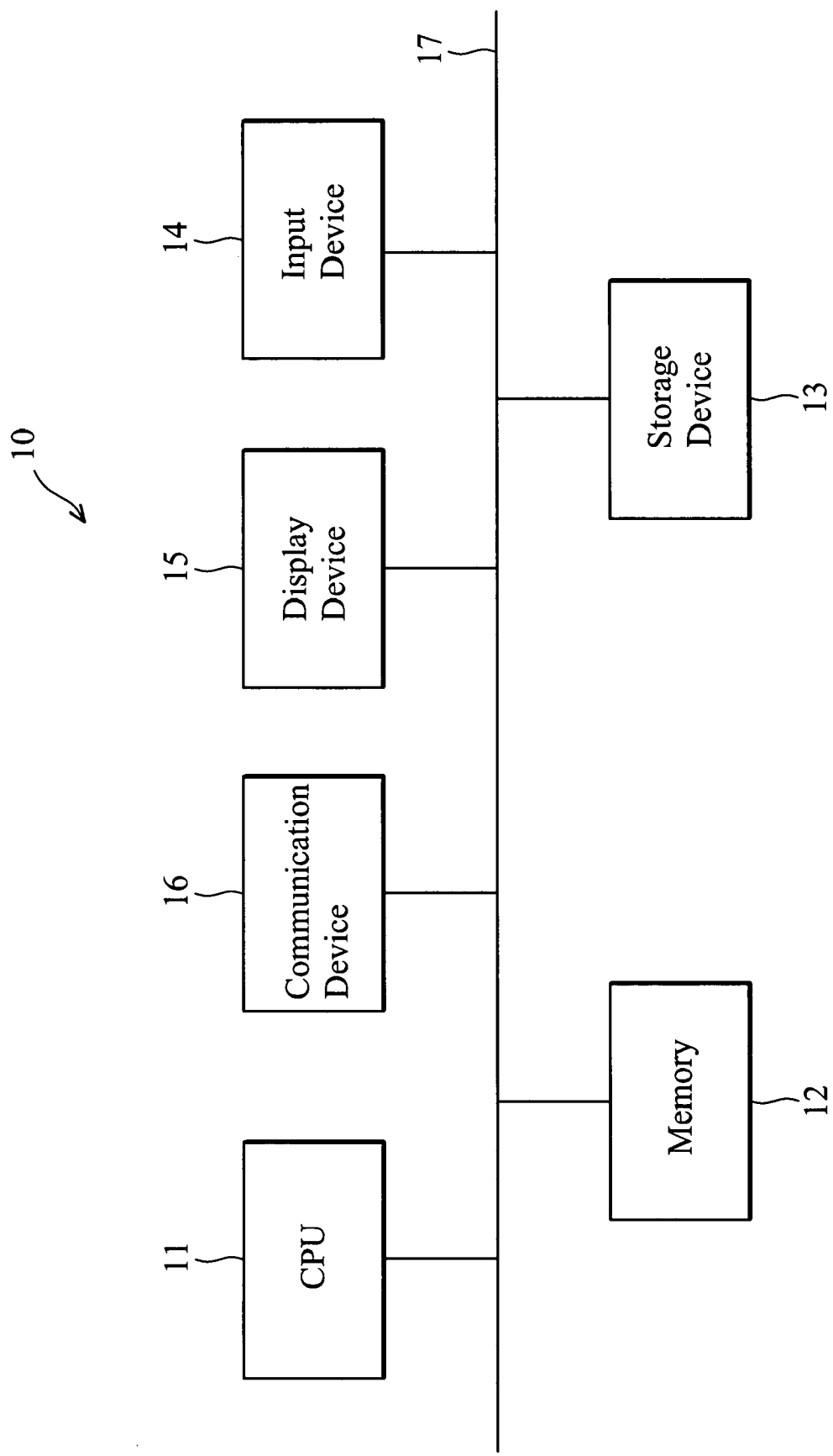
FIG. 2 is a diagram of the architecture of an ID management apparatus according to one embodiment of the present invention.

FIG. 2 is a diagram of the architecture of the ID management apparatus according to one embodiment of the present invention. The ID management apparatus 10 includes a central processing unit (CPU) 11, memory 12, a storage device 13, an input device 14, a display device 15 and a communication device 16. The CPU 11 is connected by buses 17 to the memory 12, storage device 13, input device 14, display device 15 and communication device 16 based on Von Neumann architecture. The CPU 11, memory 12, storage device 13, display device 14, input device 15 and communication device 16 may be conventionally incorporated to a mainframe computer, a mini-computer, a workstation computer, a personal computer, or a mobile computer.

The CPU 11, controlled by instructions received from the memory 12 and an operator through the input device 14, executes ID management functions.

The storage device 13 can be implemented as a database system, a file, or the like, to store multiple identity mapping records. The identity mapping record preferably includes a client name 31, a client lot identity 32 and a supplier lot identity 33. FIG. 3 is a diagram of several exemplary identity mapping records according to the present invention. Referring to record 341, a client "AAA" follows supplier encoding rules to identify a wafer lot, wherein the lot ID contains four segments: character 1 represents a fab; characters 2–6 represent a manufacturing serial number; character 7 is a decimal point; and character 8 represents a split number. Referring to record 342, a client "BBB" and the supplier respectively uses "XT12345-01" and "C12345.00" to identify a wafer lot. The client lot ID contains five segments: character 1 represents a product model; character 2 represents a fab; characters 3–7 represent a manufacturing serial number provided by the supplier; character 8 is a hyphen; and character s 9–10 represent a split number. The supplier lot ID contains four segments: character 1 represents a fab; character s 2–6 represent the manufacturing serial number; character 7 is a decimal point; and characters 8–9 represent a split number. Referring to records 343 to 345, a client "CCC" and the supplier uses different IDs to identify a wafer lot. The client lot ID contains six segments: character 1 represents a fab; character 2 represents the last number of a year; characters 3–4 represent a week; characters 5–7 represent an order serial number; and character 8 represents a split number. The supplier lot ID contains four segments similar to those in the record 342. That three supplier lot IDs with different split numbers corresponding to a client lot ID indicates that the original wafer lot has been split into three smaller lots during the semiconductor manufacturing process. The implementation of the identity mapping record described above is not limited to a single table/file, but also to multiple related tables/files. Consistent with the scope and spirit of the invention, additional or different fields may be provided.

Figure 4:
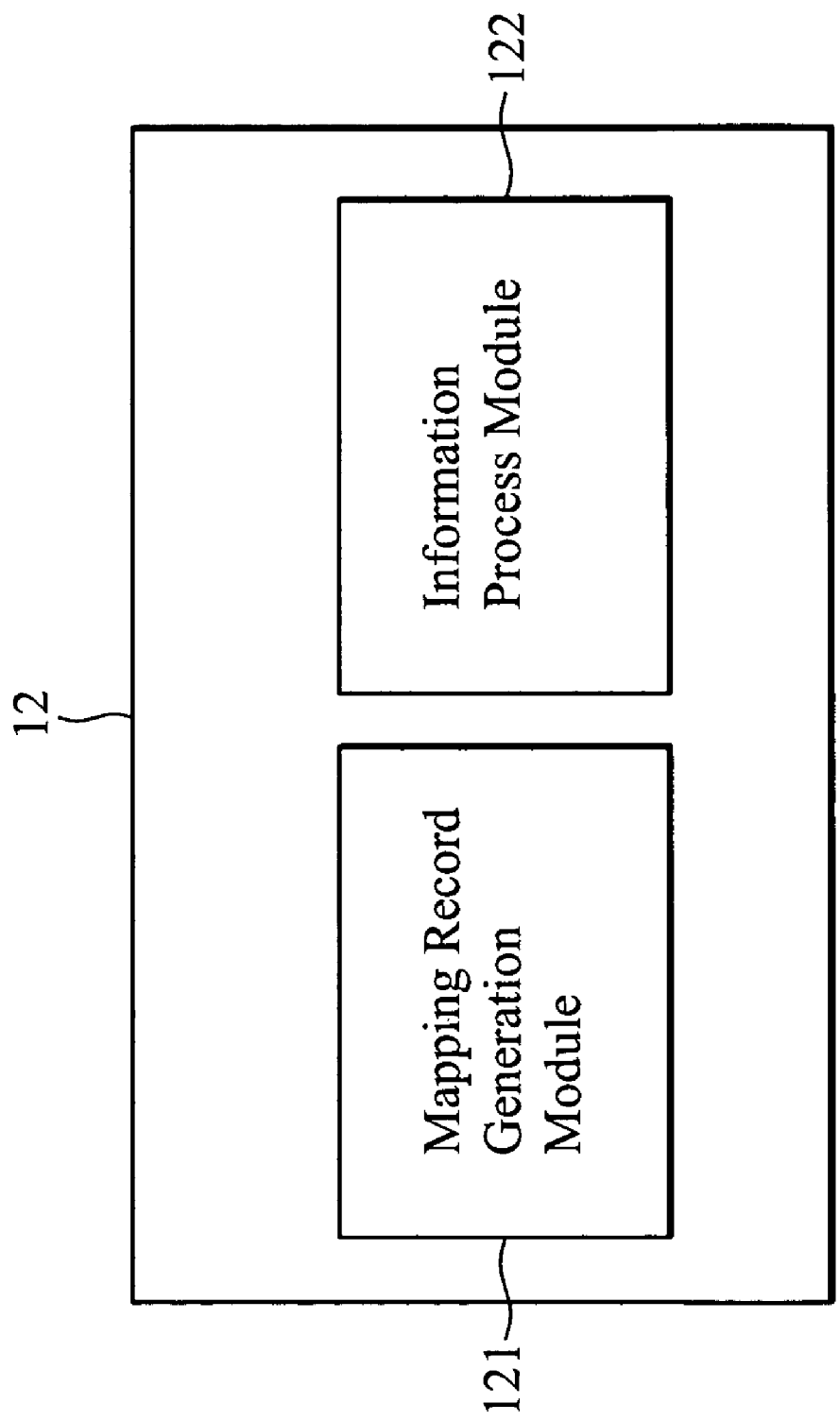
FIG. 4 is a diagram of the software architecture of wafer ID management according to one embodiment of the invention.

FIG. 4 is a diagram of the software architecture of wafer lot ID management according to one embodiment of the invention. The memory 12 is preferably a random access memory (RAM), but may also include read-only memory (ROM) or flash ROM. The memory 12 preferably includes a mapping record generation module 121 and an information process module 122, which include routines for performing lot ID management functions.

The mapping record generation module 121 creates an identity mapping record containing a client lot ID and a supplier lot ID when a new wafer lot is initiated. The module additionally separates an identity mapping record into multiple identity mapping records upon receiving a message indicating that a wafer lot has been split into smaller lots during the semiconductor manufacturing process.

The information process module 122 receives an information request with a client lot ID from a client and subsequently acquires at least one supplier lot ID from the identity mapping records. The manufacturing information, such as processing status, engineering data, a projected finish date or others, is acquired by issuing an information request with the supplier lot ID to the MES 21. The logistical information, such as projected delivery date, shipping notice, invoice or others, is acquired by issuing an information request with the supplier lot ID to the MIS 21. Finally, the resulting information is sent to the client.

Additionally, the information process module 122 receives a process control request, such as holding a wafer lot, banking a wafer lot, releasing a held lot or releasing a banked lot, with a client lot ID from a client and subsequently acquires at least one supplier lot ID from the identity mapping records. The resulting message indicating the process control is permitted or prohibited, is acquired by issuing the process control request with the supplier lot ID to the MES 21. Finally, the resulting message is sent to the client.

Those skilled in the art will recognize that the above functions of the MES 21, MIS 22, mapping record generation module 121 and information process module 122 can be integrated into a single computer device.

Figure 5:
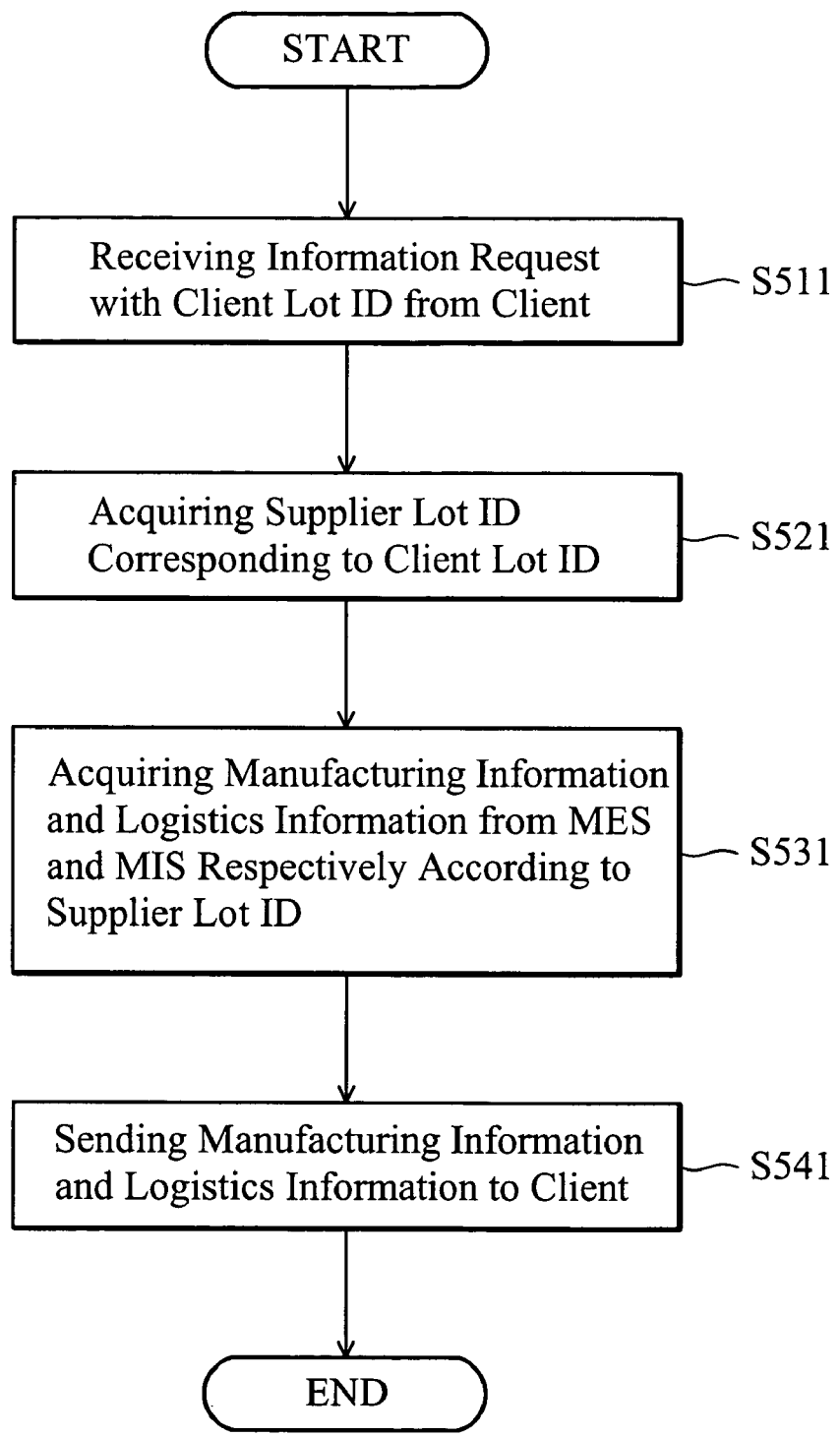
FIG. 5 is a flowchart showing the method of wafer lot ID management according to the present invention.

FIG. 5 is a flowchart showing the method of wafer lot ID management according to the present invention. The method begins in step S511 by receiving an information request with client lot ID from a client. In step S521, at least one supplier lot ID is acquired from the identity mapping records according to the client ID. In step S531, manufacturing information, such as processing status, engineering data, a projected finish date or others, is acquired by issuing an information request with the supplier lot ID to the MES 21, and the logistical information, such as projected delivery date, shipping notice, invoice or others, is acquired by issuing an information request with the supplier lot ID to the MIS 21. Finally, the resulting information is sent to the client in step S541.

The invention discloses a business method utilized between a client and a supplier. The client acquires the manufacturing information or logistical information or controls processes of a wafer lot by providing a client lot ID instead of a supplier lot ID.

Figure 6:
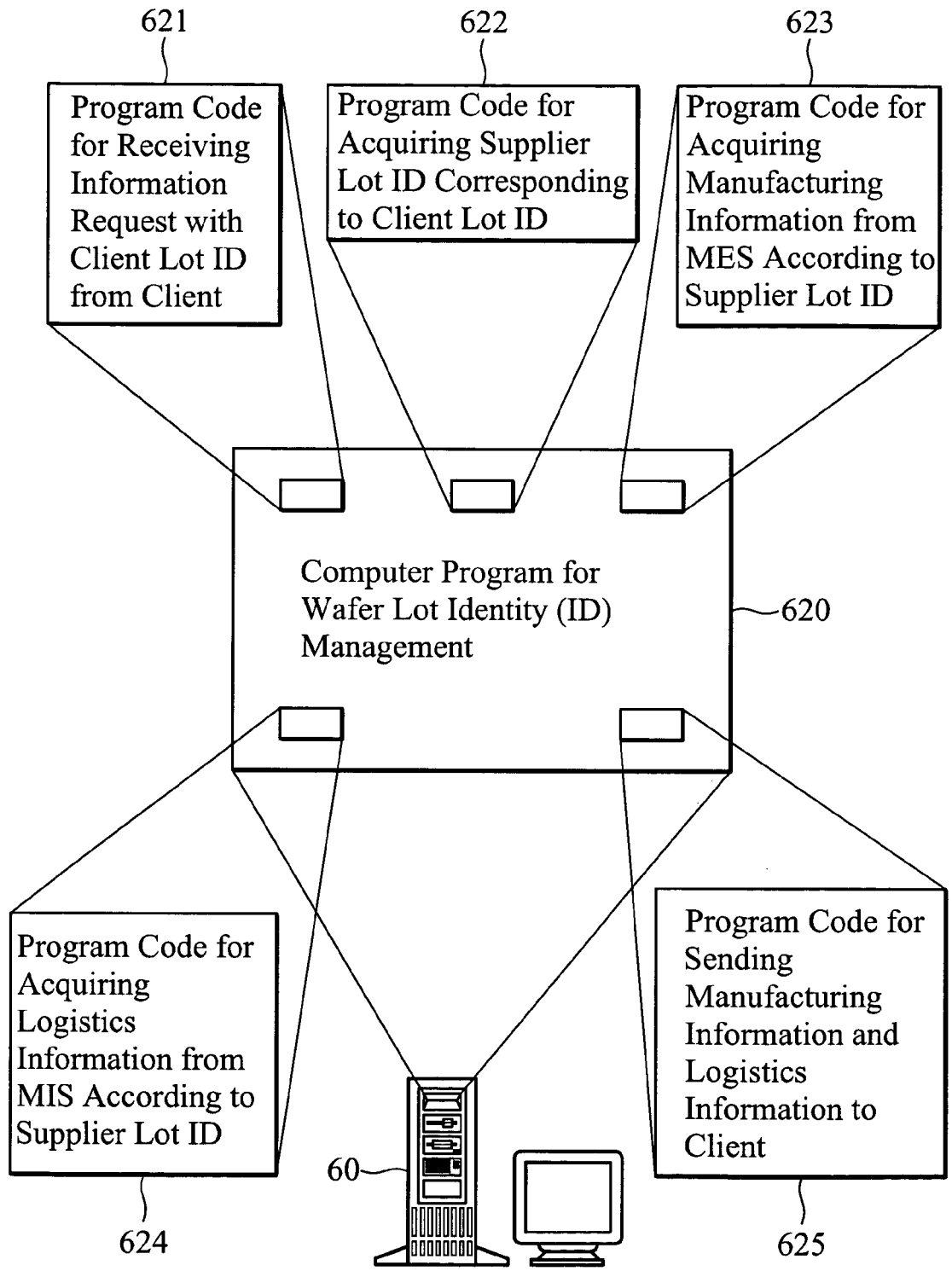
FIG. 6 is a diagram of a storage medium for storing a computer program providing the method of wafer lot ID management according to one embodiment of the invention.

The invention additionally discloses a storage medium for storing a computer program providing the disclosed method of wafer lot ID management, as shown in FIG. 6. The computer program product includes a storage medium 60 having computer readable program code embodied in the medium for use in a computer system, the computer readable program code comprising at least computer readable program code 621 receiving an information request with a client lot ID from a client, computer readable program code 622 acquiring at least one supplier lot ID from identity mapping records according to the client lot ID, computer readable program code 623 acquiring manufacturing information by issuing an information request with the supplier lot ID to a MES, computer readable program code 624 acquiring logistical information by issuing an information request with the supplier lot ID to an MIS, and computer readable program code 625 sending the resulting information to the client.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of wafer lot identity (ID) management, comprising:
   an ID management apparatus, comprising a storage device and an information process module, the storage device capable of storing a plurality of ID mapping records, each ID mapping record storing a client lot ID and a supplier lot ID information identifying a wafer lot, the client lot ID encoded by a client encoding rule provided by a client, the supplier lot ID encoded by a supplier encoding rule, the information process module receiving an information request with the client lot ID from the client, acquiring at least one of the supplier lot IDs identifying the same wafer lot as the received client lot ID contingent upon information stored in the ID mapping records, acquiring manufacturing information or logistical information or performing a process control on lot according to the acquired supplier lot ID, and sending the manufacturing information or the logistical information to the client.

2. The system of claim 1 wherein the ID management apparatus further comprises a mapping record generation module dividing the ID mapping record into multiple ID mapping records when a wafer lot is split into smaller wafer lots during the semiconductor manufacturing process, and the divided ID mapping records respectively are utilized to identify the smaller wafer lots by different supplier lot IDs and the original client lot ID, comprising information that the original wafer lot corresponding to a client lot ID has been split into smaller wafer lot, such that the original client lot ID can be converted into the divided supplier lot IDs for subsequent various information acquisition or lot control.

3. The system of claim 1 wherein the manufacturing information comprises processing status, engineering data or a projected finish date.

4. The system of claim 3 wherein the manufacturing information is provided from a manufacturing execution system (MES).

5. The system of claim 1 wherein the logistical information comprises a projected delivery date, a shipping notice or an invoice.

6. The system of claim 5 wherein the logistical information is provided from a management information system (MIS).

7. The system of claim 1 wherein the process control comprises holding a lot, banking a lot or releasing a lot.

8. The system of claim 7 wherein the process control mechanism is provided from a manufacturing execution system (MES).

9. A method of wafer lot identity (ID) management, the method comprising using a computer to perform the steps of:
   receiving an information request with a client lot ID from a client;
   acquiring at least one of a plurality of supplier lot IDs identifying the same wafer lot as the received client lot ID contingent upon information stored in the ID mapping records, each of the ID mapping records storing one of the client lot IDs and one of the supplier lot IDs information identifying a wafer lot, the client lot ID encoded by a client encoding rule provided by the client, the supplier lot ID encoded by a supplier encoding rule;
   acquiring manufacturing information or logistical information according to the acquired supplier lot ID; and
   sending the manufacturing information or the logistical information to the client.

10. The method of claim 9 further comprising a step of dividing the ID mapping record into multiple ID mapping records when a wafer lot is split into smaller wafer lots during the semiconductor manufacturing process, and the divided ID mapping records respectively are utilized to identify the smaller wafer lots by different supplier lot IDs and the original client lot ID, comprising information that the original wafer lot corresponding to a client lot ID has been split into smaller wafer lot, such that the original client lot ID can be converted into the divided supplier lot IDs for subsequent various infonnation acquisition or lot control.

11. The method of claim 9 wherein the manufacturing information comprises processing status, engineering data or a projected finish date.

12. The method of claim 11 wherein the manufacturing information is provided by a manufacturing execution system (MES).

13. The method of claim 9 wherein the logistical information comprises a projected delivery date, a shipping notice or an invoice.

14. The method of claim 13 wherein the logistical information is provided by a management information system (MIS).

15. A machine-readable storage medium for storing a computer program which when executed performs a method of wafer lot identity (ID) management, the method comprising the steps of:
   receiving an information request with a client lot ID from a client;

acquiring at least one of a plurality of supplier lot IDs identifying the same wafer lot as the received client lot ID contingent upon information stored in the ID mapping records, each ID mapping record storing one of the client lot IDs and one of the supplier lot IDs information identifying a wafer lot, the client lot ID encoded by a client encoding rule provided by the client, the supplier lot ID encoded by a supplier encoding rule;

acquiring manufacturing information or logistical information according to the acquired supplier lot ID; and sending the manufacturing information or the logistical information to the client.

16. The machine-readable storage medium of claim 15, wherein the method further comprises a step of dividing the ID mapping record into multiple ID mapping records when a wafer lot is split into smaller wafer lots during the semiconductor manufacturing process, and the divided ID mapping records respectively are utilized to identify the smaller wafer lots by different supplier lot IDs and the original client lot ID, comprising information that the original wafer lot corresponding to a client lot ID has been split into smaller wafer lot, such that the original client lot ID can be converted into the divided supplier lot IDs for subsequent various information acquisition or lot control.

17. The computer-readable storage medium of claim 15 wherein the manufacturing information comprises processing status, engineering data or a projected finish date.

18. The computer-readable storage medium of claim 17 wherein the manufacturing information is provided by a manufacturing execution system (MES).

19. The computer-readable storage medium of claim 15 wherein the logistical information comprises a projected delivery date, a shipping notice or an invoice.

20. The computer-readable storage medium of claim 19 wherein the logistical information is provided by a management information system (MIS).

21. A method of wafer lot identity (ID) management, utilized between a client and a supplier, the method comprising the steps of:

acquiring manufacturing information or logistical information from the supplier, or controlling processes through the supplier by the client using a client wafer lot ID identifies a wafer lot and encoded by a client encoding rule provided by the client.

22. The method of claim 21 wherein the manufacturing information comprises processing status, engineering data or a projected finish date.

23. The method of claim 21 wherein the logistical information comprises a projected delivery date, a shipping notice or an invoice.

24. The method of claim 21 wherein the process comprises holding a wafer lot, banking a wafer lot, releasing a held wafer lot or releasing a banked wafer lot.

25. A system of wafer lot identity (ID) management, comprising:

an ID management apparatus, comprising a storage device and a information process module, the storage device capable of storing a plurality of ID mapping records, each ID mapping record storing both a client lot ID and a supplier lot ID information identifying a wafer lot, the client lot ID encoded by a client encoding rule provided by a client, the supplier lot ID encoded by a supplier encoding rule, the information process module receiving a process control request with the client lot ID from the client, acquiring at least one of the supplier lot IDs identifying the same wafer lot as the received client lot ID contingent upon information stored in the ID mapping records, performing a process control corresponding to the process control request with the acquired supplier lot ID, and sending a resulting message to the client if permitted.

26. The system of claim 25 wherein the ID management apparatus further comprises a mapping record generation module dividing the ID mapping record into multiple ID mapping records when a wafer lot is split into smaller wafer lots during the semiconductor manufacturing process.

27. The system of claim 25 wherein the process control comprises holding a wafer lot, banking a wafer lot, releasing a held wafer lot or releasing a banked wafer lot.

28. The system of claim 27 wherein the process is performed by a manufacturing execution system (MES).

* * * * *